UNITED STATES PATENT OFFICE.

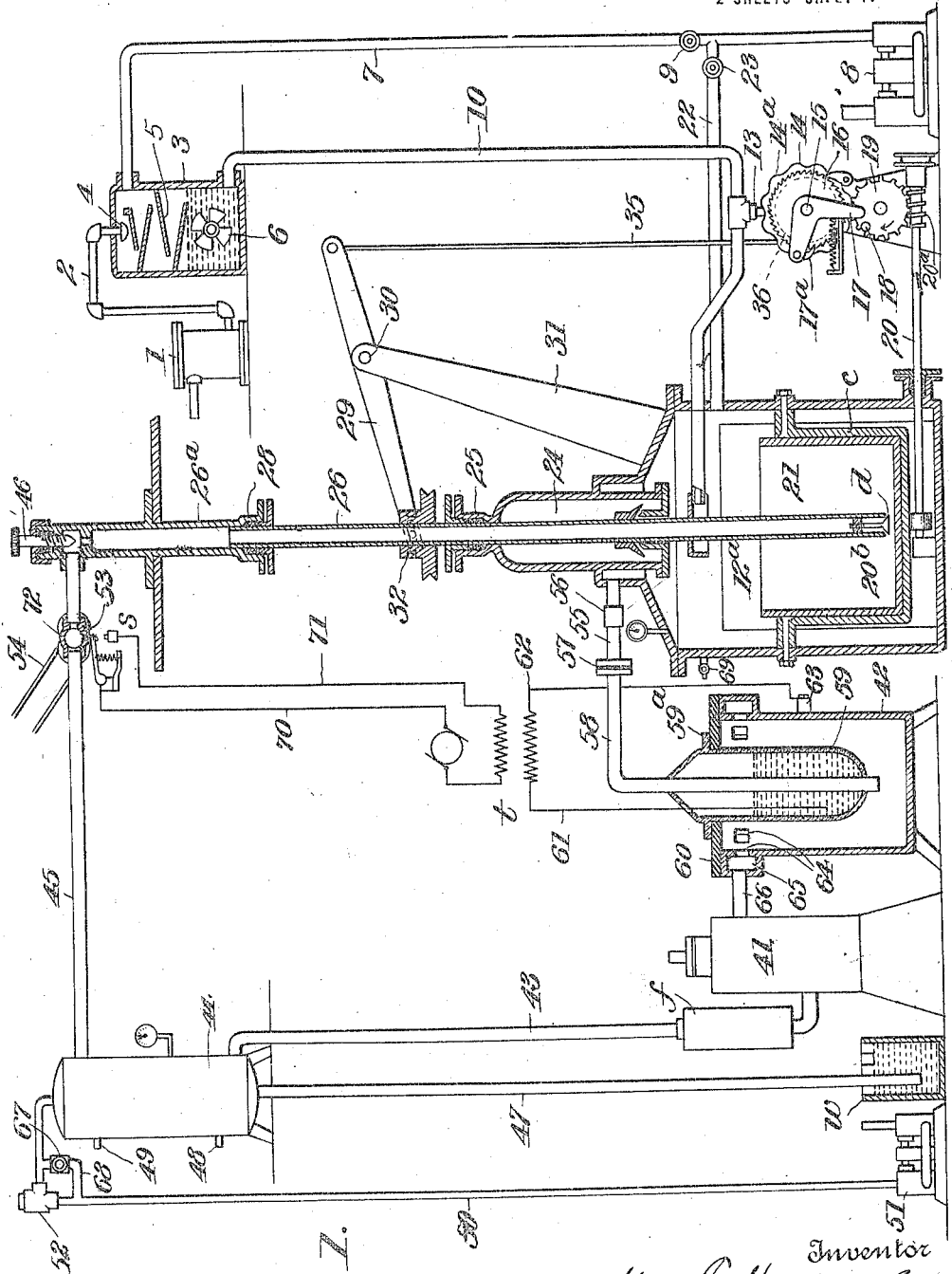

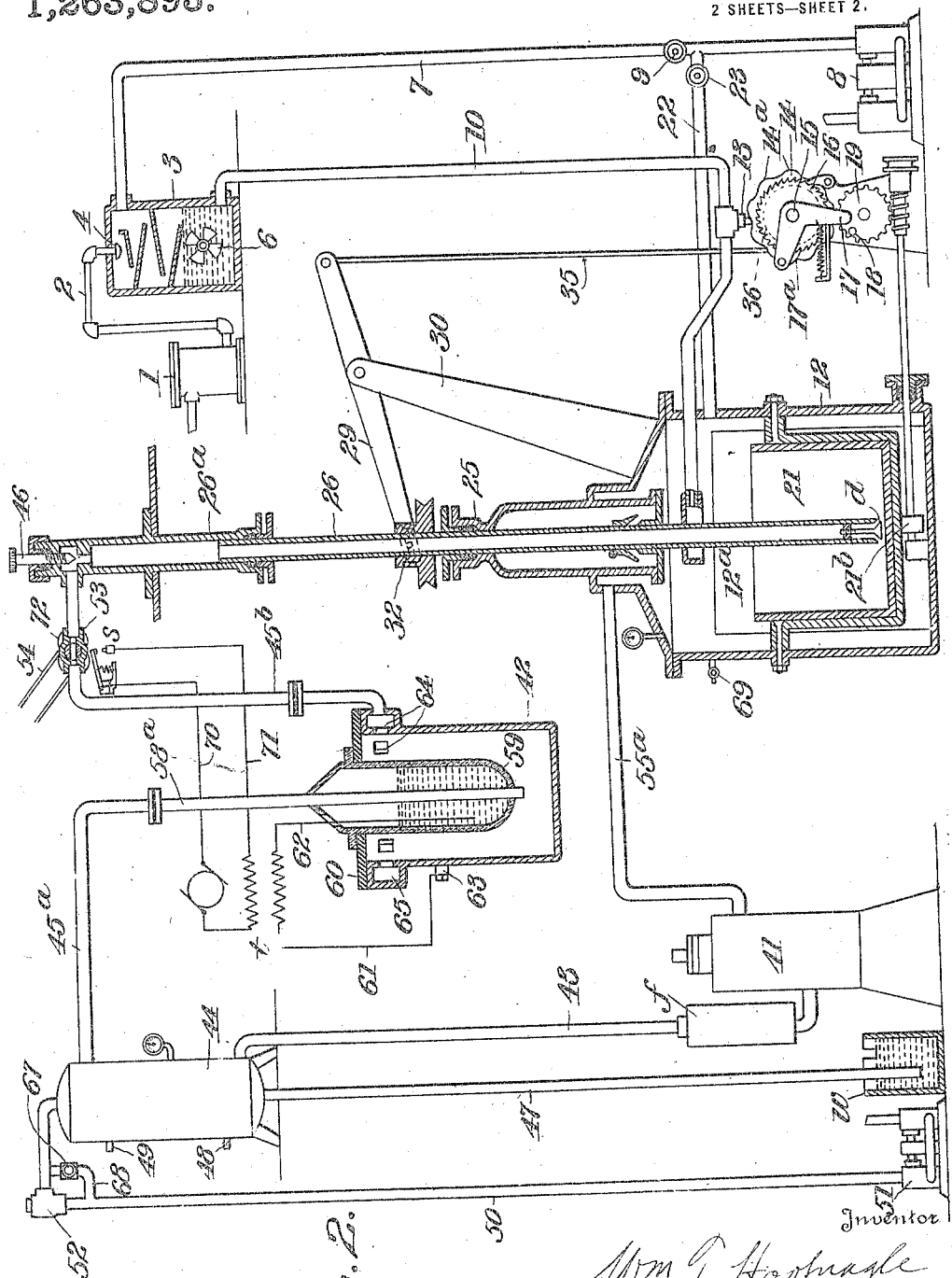

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

METHOD AND APPARATUS FOR EVAPORATING LIQUIDS.

1,263,893.     Specification of Letters Patent.     Patented Apr. 23, 1918.

Application filed October 12, 1916. Serial No. 125,247.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Methods and Apparatus for Evaporating Liquids, of which the following is a specification.

This invention relates to a method of and apparatus for effecting rapid vaporization of liquids in a partial vacuum. The invention is particularly adapted to the purposes of refrigeration and ice-making, but it may also be employed for removing water from any body, such as water from brine to obtain the salt crystals, or for drying or desiccating any substance containing water or moisture. In the following specification and by reference to the accompanying drawing, the invention will be described as applied to the refrigerating art.

In making ice by the vacuum process, it has heretofore been necessary to maintain a very low pressure, approximating 4 m. m. absolute pressure, in the freezing chamber in order to lower the temperature of the water to the freezing point. At this low pressure, the volume of the vapor withdrawn from the water is very great and the most serious problem in making ice by this process, in commercial quantities, has been that of disposing of the vapors by removing them from the freezing chamber. Attempts to remove the vapors by exhaust pumps alone have proven commercially impractical because of the enormous size or capacity of the pumps required for the purpose. This latter objection is overcome in practice, and ice is commercially manufactured, by providing absorbers between the pump and the freezing chamber, whereby a large amount of the vapor is removed in the absorber system and a pump of smaller capacity is used to exhaust the unabsorbed gases and vapors from the chamber. But the use of absorbers in which hydroscopic fluids, such as sulfuric acid, are employed, entails the use of concentrators and other special apparatus, which involve considerable expense for operation and maintenance.

By means of the present invention, a freezing temperature may be maintained in the freezing chamber with exhaust mechanism of small capacity and without the use of absorbers. In carrying out my invention, instead of absorbing the vapor by fluid having an affinity for water, I provide means whereby the volume of vapor leaving the water is reduced before entering the pump, by coalescence on ions, so that the volume of vapor to be removed is brought low enough to permit of the use of a pump of small capacity. Furthermore, by the present improvements, I find it possible to maintain a freezing temperature with a much higher pressure in the freezing chamber than is required with the vacuum process as ordinarily used for ice-making.

In carrying out my invention, I provide a closed freezing chamber to which is connected suitable exhaust mechanism, and instead of attempting to exclude air entirely from the apparatus, I arrange to permit a certain amount of air to flow in close contact with the water to be cooled or frozen, and thence to mingle with the vapors rising from the water on their way to the exhaust mechanism. A marked increase in the vaporization of the water and lowering of the temperature is noted, over the ordinary process, where a limited quantity of air is admitted in close contact with the water, as explained in my prior application, Serial No. 43,971, filed Aug. 6, 1915.

The problem of exhausting the vapor from the freezing chamber is relieved to a considerable extent by the condition that, where the air is used, it is not necessary to operate at so high a vacuum, and hence, to expel the gases, less compression is required in the exhaust mechanism, as explained in the aforesaid application. By my present invention, I am enabled to still further increase the efficiency of the plant by causing coalescence of the vapor before it passes to the exhaust mechanism, whereby the volume of vapor to be expelled by said mechanism is greatly reduced. In order to accomplish this coalescence, I provide means for ionizing the mingled gas and vapor flowing from the water to the pump, or the air or other ionizable gas before mingling with the vapor, and the ions form nuclei around which the vapors coalesce. The ionizing influence is preferably produced by an electric discharge, although it may be produced by other means. The ionization is more complete because of the relatively low pressure prevailing in the apparatus, which permits ionization to take place by collisions between charged and uncharged particles. Provision is made for intermittently expanding the gases, which reduces the temperature of the gases and facilitates coalescence of the vapor around the ions; but with very strong ionization, this expansion is not essential.

Figure 1 of the accompanying drawing illustrates, partly in outline and partly in detail, a refrigerating plant illustrative of my invention; and, Fig. 2 is a similar view showing the ionizing chamber differently connected.

Referring to Fig. 1 of the drawing, 1 indicates a pump for delivering water, from a suitable source, to a deaerating chamber 3, through a pipe 2, and spraying nozzle 4. The deaerating chamber contains baffles 5 and an agitating device 6, and this chamber is connected by a pipe 7 to an exhaust pump 8. In operation, the water flows over the baffles in a thin stream and is agitated in the bottom of the chamber, and most of the air entrained in the water passes off through the pipe 7. The pump 8 is constantly in operation and the valve 9 in the pipe 7 remains partly or wholly open.

The water from the deaerating chamber 3 is allowed to pass at intervals, in regulated quantities, through a pipe 10, having an annular outlet nozzle within a closed evaporating or freezing chamber 12. The pipe 10 contains a normally closed valve, indicated at 13, the stem of which is adapted to be engaged and moved, to open the valve, by cam surfaces $14^a$ on a cam wheel 14. This cam wheel is mounted upon a suitable shaft 15, to which is secured a ratchet wheel 16, and upon the shaft is arranged a bell crank ratchet lever 17, having a pawl $17^a$ for engaging the teeth of the ratchet wheel. One arm of the ratchet lever projects into the path of movement of a pin 18, on a worm wheel 19, which is driven by a worm $20^a$, on a shaft 20, connected to a suitable source of power (not shown). The worm wheel turns in the direction of the arrow, and at each revolution of said wheel, the pin 18 engages the ratchet lever and causes the pawl thereon to move the ratchet wheel and cam wheel a distance equal to the length of one of the cams $14^a$. The stem of the valve normally rests between two of the cams on the cam wheel, as shown, and at each movement of the cam wheel, the valve opens and closes, admitting a pre-determined quantity of water to the refrigerating chamber. The amount of water admitted may be regulated by adjusting the length of the valve stem so as to increase or decrease the duration of its engagement with the successive cams.

The evaporating or refrigerating chamber is provided with an opening in one side through which a freezing can 21 may be inserted and removed, and a door $12^a$ is provided for hermetically sealing this opening. The can is supported upon a cradle $c$, which is hung on pivots on the sides of the chamber 12, and a cam $20^b$, on the shaft 20, engaging lugs on the cradle, swings the latter and the can as the shaft rotates. A pipe 22 connects the evaporating or refrigerating chamber with the pipe 7, and thence to the exhaust pump 8, and by means of these connections the refrigerating chamber may be preliminarily exhausted after the freezing can is placed within it and the door of the chamber is closed. A valve 23 in the pipe 22 may be opened to connect the freezing chamber with the pump 8, and after said chamber has been exhausted, this valve may be closed or left partially open, according to the conditions prevailing in the refrigerating chamber.

In the central part of the top of the refrigerating chamber is arranged a cylindrical casing 24, in the upper part of which is a stuffing box 25, and a pipe 26 extends through this stuffing box into the refrigerating chamber, this pipe carrying at its lower end a conical air deflecting device $d$. The pipe 26 is movable vertically in the stuffing box 25 and a stationary pipe section $26^a$, into which it fits telescopically. A stuffing box 28 is arranged within the lower end of the section $26^a$ and surrounds the pipe 26. The pipe 26 is supported by a lever 29, fulcrumed at 30 upon a supporting arm 31, projecting from the casing of the refrigerating chamber. One arm of the lever 29 has a forked end which engages a collar 32, secured to the pipe, and the opposite arm of the lever is connected by a cable 35 to a drum 36, shown in dotted lines, operated by the ratchet wheel 16. It will be evident that each time the ratchet wheel is moved to cause the valve 13 to open and admit water to the refrigerating chamber, the pipe 26 and air distributer $d$ will be raised a given distance.

The casing 24, surrounding the pipe 26, is provided in order to form an oil-well to receive any oil or grease which may pass downward on said pipe from its bearings, and to prevent this oil and grease from entering the freezing can, where it would not only contaminate the water, but where it would very seriously interfere with the cooling or freezing operation, since it would prevent the evaporation of the water.

A main exhaust pump 41, preferably of the reciprocating type, has its suction end connected to the interior of the refrigerating chamber, through an ionizing chamber 42, presently to be described, and the compression side of the pump is connected by a pipe 43, through an oil filter $f$, to a surface condenser 44, from which a return pipe 45 extends to the upper end of the pipe sections 26ª. In the upper end of the pipe section 26ª is arranged a hand operated valve 46, for regulating the pressure of air flowing from the pipe 45 to the pipe 26. During the operation of the apparatus, the vapors drawn from the refrigerating chamber, and also the air contained therein, pass through the ionizing chamber 42 and pipe 43 to the surface condenser where the vapors are condensed, the water of condensation passing through an extended drainage pipe 47 to the well w, while the air is returned to the refrigerating chamber through the pipes 45 and 26. The air within the apparatus thus flows in a closed circuit, while the vapors are condensed and removed. The cooling water for the condenser enters through a pipe 48 and leaves the condenser by way of a pipe 49. For removing surplus air from the apparatus, a pipe 50 is connected to the condenser and to a small exhaust pump 51, and in this pipe is arranged a suitable pressure regulating valve 52, adapted to open automatically when the air pressure in the apparatus is greater than necessary for the proper operation of the apparatus.

The features thus far described are much the same as in my prior application above referred to. In the present invention there is provided in the pipe 45 a rotary valve 53, which is constantly driven while the plant is in operation by a belt 54, connected to a suitable source of power. This valve operates quite rapidly to check and release the air flowing through the pipe to the freezing chamber and the intermittently moving air flows out in short gusts over the surface of the water, being deflected as it passes out of the pipe 26 by the conical deflector d. This deflector is adjustably mounted in the end of the pipe so as to vary the width of the outlet opening. By this arrangement, the air is directed over the water, and in the close contact with it which is found to be very essential for creating a low temperature, and the intermittent flow of the air causes an agitation of the water, which, as is well known, accelerates the process of forming ice when the water is at freezing temperature. The reciprocating pump 41 causes an intermittent expansion of the gas and vapor in said chamber, and a further intermittent expansion therein is caused by the checking of the air flow at the valve 53, which expansions lower the temperature of the gases and facilitate condensation, as hereinafter explained.

Interposed between the evaporating or freezing chamber and the main exhaust pump 41, is arranged what may be termed an ionizing chamber 42, through which the vapors and air flow on their way to the pump and in which they are subjected to an ionizing influence which causes coalescence of the vapor. As shown, a pipe 55, having a valve 56 therein, leads from the upper part of the freezing chamber, and this pipe is connected by an insulating joint 57 to a pipe 58, of non-conducting material, preferably glass, which latter pipe extends through the center of a cylindrical vessel 59, of dielectric material, preferably glass, supported centrally within the casing 42. The casing 59 is provided with a flange 59ª, which rests upon a cover of insulating material 60, on top of the casing 42. The vessel 59 extends through a central opening in said cover and the top and bottom of the vessel are sealed around the pipe 58. The vessel 59 contains a conducting liquid, such as acidulated water, and a wire 61 extends from one pole of a suitable current source t into said liquid. Another wire 62 extends from the opposite pole of said current source to the casing 42 by way of a binding post 63. The interior of this casing is preferably coated with a dielectric material, such as insulating enamel or glass. The body of acidulated water forms one electrode, while the casing forms an opposing electrode, and the current from the high tension source t causes a brush discharge between the concentric walls of said electrodes. The air and vapor from the evaporating or freezing chamber flows downwardly through the pipe 58 into the lower part of the casing 42, and thence upwardly through the electric field between the electrodes and out through an annular series of openings 64, in the upper part of the casing, into an annular conduit 65, and thence through a pipe 66, preferably of insulating material, to the pump 41. During the course of the air and vapor through the ionizing chamber they are subject to the ionizing influence of the electric field and the ions form nuclei around which the vapors condense. The expansion of the gases, before referred to, lowers the temperature and favors coalescence of the vapor around the ions. Because of the rarefied state of the gases and vapor, their ionization is facilitated by collisions between the charged and uncharged particles. As a result of the coalescence of the vapor, due to the ionizing process, the volume of vapor to be removed by the pump is greatly lessened, and therefore, a pump of comparatively small size may be used for removing the vapors.

In operation, if the plant illustrated in Fig. 1 is just being started, the entire system within which the air circulates, may be exhausted to a low pressure by operating the pumps 8 and 51, after the can has been placed in the freezing chamber and the door of the latter has been closed. By opening the valve 23, the pump 8 will exhaust air directly from the freezing chamber and circulating system, and by opening a valve 67 in a pipe 68, which forms a by-pass around the pressure regulating valve 52, the pump 51 will exhaust air directly from the system. When a high vacuum has been attained, the valves 23 and 67 are closed and the main exhaust pump 41 is started into operation as well as the ratchet mechanism controlling the admission of water and the electric field in the ionizing chamber is established. The electric current may be applied constantly to the ionizing chamber, but it is advantageous to apply the current at the times of the intermittent expansions of the gases in the vacuum chamber, and therefore, the primary circuit 70—71 of the transformer may be provided with a normally open switch S, which will be closed by a cam 72, rotating with the valve 53, which cam will close the switch synchronously with the closing of said valve. Sufficient air to operate the apparatus remains therein after the preliminary exhaustion of the freezing chamber and circulating system. If more air is desired, it may be admitted through the valve 69, and if the apparatus contains an excess of air, while in operation, the air will be removed by the pump 51, through the pressure regulating valve 52, which opens in response to an increase in air pressure above a predetermined amount. The pipe 26 is lowered, by releasing the ratchet mechanism, until the air deflector at the bottom of the pipe is close to the bottom of the can and the valve 13 is opened at timed intervals, allowing small charges of water to enter the freezing chamber and flow to the bottom of the freezing can. As each charge is admitted, the air pipe 26 is moved upward one step, thus keeping the lower end of the pipe always above the surface of the water, but close to it. The admission of water and the lifting of the air pipe, it will be understood, will be timed so that these operations will take place only as fast as the successive charges of water can be frozen, and thus the ice will be frozen in successive layers, into a solid block, while the air deflector at the lower end of the air pipe will always be close to the layers of water as they are spread out on the ice beneath. The cradle on which the can is supported is constantly rocked so as to flow the water slowly back and forth, which facilitates the escape of any air entrained in the water, and also hastens the freezing process. The main exhaust pump 41 is kept in constant operation and the mingled air and vapors are drawn from the freezing chamber through the ionizing chamber and into the pump, coalescence of the vapors, by the ionizing process previously described, taking place in the ionizing chamber, which coalescence helps to maintain the vacuum and reduces the work required of the pump in exhausting the vapors from the vacuum chamber. The air and vapors drawn out by the pump are compressed through the oil filter into the condenser, where the vapors are condensed and pass to the well $w$, while the air returns to the freezing chamber through the pipes 45 and 26, the rotary valve 53, in the pipe 45, causing the air entering the freezing chamber to pulsate, and thus causing a swifter flow of the air over the surface of the water, which is found advantageous both in lowering the temperature and in gently agitating the water, which hastens its conversion into ice when the temperature of the water is lowered to or below the freezing point. The velocity of the air over the water may be regulated to some extent by adjusting the valve 46 to more or less restrict the passageway between the pipe 45 and pipe 26 leading to the interior of the refrigerating chamber. By restricting this passageway, the air flowing through the pipe 26 will be expanded and will flow with greater rapidity over the surface of the water.

After a block of ice has been frozen, the valves 56 and 46 may be closed and the valve 69 opened to break the vacuum in the freezing chamber, and when the can has been removed and an empty can inserted, the door of the freezing chamber will be closed and the air pipe lowered, and the pump 8 will then exhaust the freezing chamber and the pipe 26, after which the valves 46 and 56 will be opened to connect the freezing chamber with the rest of the circulating system.

While the apparatus could be operated with air admitted from the atmosphere and exhausted again to the atmosphere, this would require a much greater expenditure of power than is necessary by the system herein described, where the air is circulated within the apparatus, and the closed air circulating system is therefore preferred. For the purpose of causing a coalescence of vapors within the vacuum chamber, I may admit other ionizable gases than air to said chamber; but for practical and economical reasons, air is the preferred medium. The ionizing of the gases might also be accomplished by any well known means other than the application of a brush discharge; but for practical reasons, the electrical method of causing ionization of the gases is preferred.

With the apparatus and method herein described, water can be frozen with a pressure as high at 35 m. m. prevailing in the refrigerating chamber; whereas, by the usual vacuum process where air is excluded as far as practicable, freezing does not take place at a greater pressure than approximately 4.6 m. m.; also by the present method, the freezing process is carried out much more rapidly than by the ordinary vacuum process. By the vacuum system in the claims, I mean that part of the apparatus in which the pressure is maintained low by the exhaust pump.

Instead of ionizing the air while mingled with the vapors in the freezing chamber, or between said chamber and the exhaust pump, the air or other gas may be ionized before it is introduced into the freezing chamber. This is illustrated in Fig. 2, wherein the similarly numbered parts are the same as in Fig. 1. In Fig. 2, however, the freezing chamber is connected directly to the pump 41, instead of through the ionizing chamber, and the latter chamber is connected between the condenser and the pipe leading into the freezing chamber. Thus, in Fig. 2, the pipe 55$^a$ leads from the chamber 12 to the pump 41, while the inlet pipe 58$^a$ of the ionizing chamber, is connected to pipe 45$^a$ leading from the condenser 44, and the outlet pipe 45$^b$ from the ionizing chamber leads through valve 53 to the pipes 26$^a$ and 26, to the chamber 12.

With this arrangement, it will be evident that the air, or other ionizable gas employed, instead of passing through the ionizing chamber after leaving the freezing chamber, as in Fig. 1, will flow first through the ionizing chamber and then to the freezing chamber by way of pipes 45$^a$, 45$^b$, 26$^a$, and 26, and will be subjected to the ionizing influence before entering the freezing chamber. The operation of the apparatus in all other respects will be the same as in Fig. 1, and when the ionized gas mingles with the vapors on its way to the pump through the freezing chamber, the vapor coalescence will take place the same as in the arrangement shown in Fig. 1, wherein the gas is ionized while mingled with the vapors.

It will be evident that by admitting brine, instead of fresh water, to the evaporating chamber, the water from the brine will be evaporated, leaving the salt crystals, and similarly, any substance containing water or moisture, placed in said chamber, can be dried, without freezing, by operating the apparatus with a somewhat higher pressure in the evaporating chamber than that required for ice-making. For drying purposes, the form of the evaporating chamber may be changed to suit the substances to be treated, and the freezing can and support therefor may be omitted.

What I claim is:

1. The method of evaporating liquids in a vacuum system which comprises constantly exhausting the system, admitting a regulated quantity of ionizable gas to said system, and subjecting said gas to an ionizing influence.

2. The method of evaporating liquids in a vacuum system which comprises constantly exhausting the system, admitting a regulated quantity of ionizable gas to said system, and subjecting said gas to an intermittent ionizing influence.

3. The method of evaporating liquids in a vacuum system which comprises constantly exhausting the system, admitting a regulated quantity of ionizable gas to said system, intermittently expanding the gas within the system, and subjecting the gas to an ionizing influence.

4. The method of evaporating liquids in a vacuum system which comprises constantly exhausting the system, admitting a regulated quantity of ionizable gas to said system, intermittently expanding the gas within the system and intermittently subjecting the gas to an ionizing influence.

5. The method of evaporating liquids in a vacuum system which comprises constantly exhausting the system, admitting a regulated current of air to flow in close contact with the liquid, and applying an ionizing influence to the air.

6. The method of evaporating liquids which comprises introducing the liquid into a vacuum system, constantly exhausting the system, causing a restricted current of air to flow in close contact with the liquid, and applying an ionizing influence to the air.

7. The method of evaporating liquids which comprises introducing the liquid and an ionizable gas into a vacuum system, constantly exhausting the system, and applying an ionizing influence to the gas and vapor within the system.

8. The method of evaporating liquids which comprises introducing the liquid and an ionizable gas into a vacuum system, constantly exhausting the system, and applying an electrical ionizing influence to the gas and vapor within the system.

9. The method of evaporating liquids which comprises introducing the liquid and ionizable gas into a vacuum system, constantly exhausting the system, and applying an ionizing influence to the gas and vapor within the system at a point remote from the liquid.

10. The method of evaporating liquids which comprises introducing the liquid into a vacuum system, constantly exhausting the system, admitting a restricted current of air to said system, and applying an ionizing influence to the air and vapor within the system.

11. The method of evaporating liquids which comprises introducing the liquid into a vacuum system, constantly exhausting the system, admitting a restricted current of air to said system, and applying an electrical ionizing influence to the air and vapor within the system.

12. The method of evaporizing liquids which comprises introducing the liquid into a vacuum system, constantly exhausting the system, causing a restricted current of air to flow in close contact with the liquid, and applying an ionizing influence to the air and vapor within the system.

13. The method of evaporating liquids which comprises introducing the liquid into a vacuum system, constantly exhausting the system, causing a restricted current of air to flow in close contact with the liquid, and applying an electrical ionizing influence to the air and vapor within the system.

14. The method of evaporating liquids which comprises introducing the liquid into a vacuum system, constantly exhausting the system, causing a restricted, pulsating current of air to flow in close contact with the liquid, and applying an ionizing influence to the air and vapor within the system.

15. In an apparatus for evaporating liquids, a vacuum system comprising an evaporating compartment adapted to contain a liquid, means for constantly exhausting said system, means for constantly admitting an ionizable gas to said system, and means for applying an ionizing influence to the gas and vapor within the system.

16. An apparatus for evaporating liquids, comprising a vacuum system having a compartment adapted to contain a liquid, means for constantly exhausting said system, means for constantly admitting an ionizable gas to said system, and means for applying an ionizing influence to the gas.

17. In an apparatus for evaporating liquids, a vacuum system comprising an evaporating compartment adapted to contain a liquid, means for constantly exhausting said system, means for constantly admitting an ionizable gas to said system, and electrical means for applying an ionizing influence to the gas and vapor within the system.

18. In an apparatus for evaporating liquids, a vacuum system comprising an evaporating compartment adapted to contain a liquid, means for constantly exhausting said system, means for constantly admitting an ionizable gas to said system, and means for applying an ionizing influence to the gas and vapor within the system at a point remote from the liquid.

19. In an apparatus for evaporating liquids, a vacuum system comprising an evaporating compartment adapted to contain a liquid, means for constantly exhausting said system, means for constantly admitting a limited flow of air into said system, and means for applying an ionizing influence to the air and vapor within the system.

20. An apparatus for evaporating liquids, comprising a closed evaporating chamber adapted to contain a liquid, means for constantly exhausting said chamber, an ionizing chamber connected between the evaporating chamber and exhaust mechanism, and means for constantly admitting a regulated amount of ionizable gas to the ionizing chamber.

21. An apparatus for evaporating liquids, comprising a closed evaporating chamber adapted to contain a liquid, means for constantly exhausting said chamber, an ionizing chamber connected between the evaporating chamber and exhaust mechanism, means for constantly admitting a regulated amount of ionizable gas to the ionizing chamber, and means for causing an electric field in said chamber.

22. An apparatus for evaporating liquids, comprising a closed evaporating chamber adapted to contain a liquid, means for exhausting said chamber, an ionizing chamber comprising an outer metal casing and a dielectric vessel arranged within the casing and containing a conducting liquid, a conduit leading from the evaporating chamber through said vessel and opening into said casing, a pipe connecting said casing with the exhaust mechanism, and an electric current source connected to said casing and to the liquid within said vessel.

In testimony whereof I have affixed my signature.

WILLIAM T. HOOFNAGLE.